United States Patent
Hamilton et al.

(10) Patent No.: US 12,200,005 B2
(45) Date of Patent: Jan. 14, 2025

(54) SECURE AND REPEATABLE DEPLOYMENT TO AN AIR-GAPPED SYSTEM

(71) Applicant: Applied Research Associates, Inc., Albuquerque, NM (US)

(72) Inventors: Anthony Hamilton, Raleigh, NC (US); Bryson Earl, Raleigh, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 282 days.

(21) Appl. No.: 17/746,650

(22) Filed: May 17, 2022

(65) Prior Publication Data
US 2023/0379349 A1 Nov. 23, 2023

(51) Int. Cl.
H04L 29/00 (2006.01)
H04L 9/40 (2022.01)

(52) U.S. Cl.
CPC ...... H04L 63/1433 (2013.01); H04L 63/0428 (2013.01)

(58) Field of Classification Search
CPC .................. H04L 63/1433; H04L 63/0428
See application file for complete search history.

(56) References Cited

U.S. PATENT DOCUMENTS

| | | | | |
|---|---|---|---|---|
| 8,826,231 B1 * | 9/2014 | Ross | ...... | G06F 21/125 717/121 |
| 8,918,781 B1 * | 12/2014 | Dubey | ...... | G06F 8/60 717/176 |
| 9,473,482 B2 * | 10/2016 | Koivuniemi | ...... | H04L 67/10 |
| 9,967,154 B2 * | 5/2018 | Masterson | ...... | G06F 9/5072 |
| 10,817,273 B1 * | 10/2020 | Lucovsky | ...... | G06F 8/60 |
| 10,996,945 B1 * | 5/2021 | Allen | ...... | G06F 8/30 |
| 11,144,289 B1 * | 10/2021 | Hwang | ...... | G06F 8/72 |
| 11,275,569 B1 * | 3/2022 | Zhang | ...... | G06F 9/455 |
| 2013/0117232 A1 * | 5/2013 | Lee | ...... | G06F 16/214 707/E17.127 |
| 2013/0232498 A1 * | 9/2013 | Mangtani | ...... | G06F 9/5038 718/104 |
| 2015/0199188 A1 * | 7/2015 | Mantripragada | ...... | G06F 21/121 717/101 |
| 2016/0154629 A1 * | 6/2016 | Noens | ...... | G06F 8/30 717/107 |
| 2017/0249132 A1 * | 8/2017 | Andrews | ...... | H04L 67/146 |
| 2017/0272321 A1 * | 9/2017 | Ramos da Rocha | ...... | H04L 41/0843 |
| 2017/0272335 A1 * | 9/2017 | Hamlin | ...... | H04L 41/5045 |
| 2018/0059660 A1 * | 3/2018 | Heatzig | ...... | B64U 10/14 |
| 2018/0191508 A1 * | 7/2018 | Scriber | ...... | H04W 12/35 |
| 2020/0177478 A1 * | 6/2020 | Dakshinyam | ...... | G06F 16/1824 |

(Continued)

*Primary Examiner* — Don G Zhao
(74) *Attorney, Agent, or Firm* — Erise IP, P.A.

(57) ABSTRACT

Systems, programs, and methods for providing secure and repeatable processes of deploying networked software applications to an air-gapped system while maintaining security are described. A deployment bundle may be generated on a cloud-based platform utilizing cloud-based development tools and infrastructure as a service. In some embodiments, an on-site or hybrid cloud/on-site system may be used. The deployment bundle may be stored on a portable storage device. The portable storage device may be connected to the air-gapped system. The deployment bundle may be deployed in the air-gapped system providing the networked software application together with any local or network service dependencies into the air-gapped system.

20 Claims, 4 Drawing Sheets

(56) References Cited

U.S. PATENT DOCUMENTS

| | | | |
|---|---|---|---|
| 2020/0311288 A1* | 10/2020 | Yankovskiy | G06F 8/60 |
| 2020/0358671 A1* | 11/2020 | Finch | H04L 67/10 |
| 2021/0091930 A1* | 3/2021 | Visoky | G05B 19/4185 |
| 2021/0279326 A1* | 9/2021 | Adam | H04L 9/30 |
| 2021/0352136 A1* | 11/2021 | Dojka | H04L 67/34 |
| 2021/0397418 A1* | 12/2021 | Nikumb | G06F 40/295 |
| 2022/0283794 A1* | 9/2022 | Wolfson | H04L 9/0822 |
| 2022/0284100 A1* | 9/2022 | Simon | G06F 8/61 |
| 2022/0284101 A1* | 9/2022 | Simon | H04L 9/3247 |
| 2022/0405092 A1* | 12/2022 | Miedema | G06F 8/60 |
| 2023/0025754 A1* | 1/2023 | Hassanzadeh | H04L 9/008 |
| 2023/0061123 A1* | 3/2023 | Low | H04L 63/08 |
| 2023/0062517 A1* | 3/2023 | Speks | G06F 3/0623 |
| 2023/0142148 A1* | 5/2023 | Ghosh | G06F 8/62 717/168 |
| 2023/0229413 A1* | 7/2023 | Basu | G06F 8/71 717/168 |
| 2023/0259343 A1* | 8/2023 | Medina | G06F 9/5072 717/177 |
| 2023/0267180 A1* | 8/2023 | Fieau | G06F 21/1087 726/27 |
| 2023/0379349 A1* | 11/2023 | Hamilton | H04L 63/0428 |

* cited by examiner

SECURE AND REPEATABLE DEPLOYMENT TO AN AIR-GAPPED SYSTEM

STATEMENT OF GOVERNMENTAL SUPPORT

This invention was made with government support under contract no. GS00Q14OADS702/FA8611-19-F-0002 awarded by the Air Force Life Cycle Management Center; contract no HDTRA1-14-D-0003/HDTRA119F0005 awarded by the Defense Threat Reduction Agency; contract no. FA8650-17-F-1068 awarded by the Air Force Research Laboratory; and contract no. W911QX-16-D-0015/W911QX-18-F-0034 awarded by the National Geospatial Intelligence Agency. The government has certain rights in the invention.

BACKGROUND

1. Field

Embodiments of the invention relate to systems and processes for providing repeatable processes across a plurality of air-gapped systems.

2. Related Art

Deploying software applications commonly relies on network connectivity for downloading configuration information, software dependencies, license management, and other network-stored information. Typical networks are connected either directly or indirectly to the Internet. The software applications that manage deployment in such networks typically connect to a home location to update and configure the applications being deployed. Furthermore, typical systems must also access remote networks to run applications (for example, to verify license information) and to develop system infrastructure and to manage system infrastructure. Likewise, software may be designed for update, maintenance, and management of network information while connected to the Internet. Any such maintenance may require Internet connectivity.

For increased security, certain networks may include secure firewalls for preventing non-verified applications and users from accessing the Internet, which can be temporarily disabled (or permanently configured) to allow access to external networks during software deployment. However, though these networks have firewalls and are thus more secure than networks without firewalls, these networks are connected to outside networks and are thus not completely secure and are vulnerable to attack. For the highest-security networks, air gaps or other isolation techniques may be utilized to create private clouds, on-premises, or hybrid networks with no connection to the larger Internet. However, the above-described deployment and maintenance procedures cannot be performed on secure systems that are not connected to the Internet. Typical air-gapped systems employ administrators to manually update applications within the air-gapped system or, less securely, briefly connect to the Internet to check for updates, download, and install new software. Such techniques are either slow when updating manually or require connection to an outside network that may compromise the air-gapped system.

As such, what is needed is systems, methods, and programs for preparing and updating air-gapped systems while remaining completely separated from any outside networks. Furthermore, the air-gapped systems must be provided to run required infrastructure applications that would otherwise be provided by systems on the Internet.

SUMMARY

Embodiments of the invention solve the above-described problems by providing specific processes for providing cloud-based infrastructure and updates to an air-gapped system. Scripts providing the updates and applications may be accessed and created independently from the air-gapped system on a cloud-based platform. The script may be created on the cloud-based platform where all development tools and testing are available. The script may then be securely stored on a portable storage device and uploaded to the air-gapped system, which may reside on a cloud-based platform or an on-premises platform, of a hybrid of both on-premises and cloud. The script may be automatically deployed in the air-gapped system reconfiguring the infrastructure and updating the local applications.

In some aspects, the techniques described herein relate to a method of deploying networked software into an air-gapped private cloud, the method including: receiving, from a user, a deployment script for the networked software independently from the air-gapped private cloud; building a deployment bundle including the networked software, the deployment script, and a network service dependency bundle for the networked software; storing the deployment bundle on a portable storage device readable by a computing device of the air-gapped private cloud; transferring the deployment bundle to the computing device of the air-gapped private cloud using the portable storage device; and executing the deployment script on the computing device of the air-gapped private cloud to: install the networked software on the computing device of the air-gapped private cloud; and deploy the network service dependency bundle on a server of the air-gapped private cloud to provide a network service in the air-gapped private cloud.

In some aspects, the techniques described herein relate to a method, further including a step of verifying a compliance of the deployment bundle with a standard of a regulatory body.

In some aspects, the techniques described herein relate to a method, further including a step of attesting the compliance of the deployment bundle with the standard of the regulatory body via a digital signature.

In some aspects, the techniques described herein relate to a method, wherein the network service in the air-gapped private cloud is a license service for the networked software.

In some aspects, the techniques described herein relate to a method, wherein the air-gapped private cloud is one of a commercial datacenter system, a private company datacenter system, a hybrid commercial and private datacenter, an edge-based server solution, and the like.

In some aspects, the techniques described herein relate to a method, wherein the deployment bundle is encrypted before storage on the portable storage device.

In some aspects, the techniques described herein relate to a method, wherein the deployment script is decrypted in the air-gapped private cloud.

In some aspects, the techniques described herein relate to a method, wherein the networked software is an update for a previous version of the networked software running in the air-gapped private cloud.

In some aspects, the techniques described herein relate to one or more non-transitory computer-readable media storing computer-executable instructions that, when executed by a processor, performs a method of deploying networked software into an air-gapped private cloud, the method including: receiving, from a user, a deployment script for the networked software independently from the air-gapped private cloud; building an encrypted deployment bundle including the networked software, the deployment script, and a software dependency for the networked software; storing the encrypted deployment bundle on a portable storage device readable by a computing device of the air-gapped private cloud; transferring the encrypted deployment bundle to the computing device of the air-gapped private cloud using the portable storage device; decrypting the encrypted deployment bundle on the computing device of the air-gapped private cloud; and executing the deployment script on the computing device of the air-gapped private cloud to: install the networked software on the computing device of the air-gapped private cloud; and install the software dependency for the networked software on the computing device of the air-gapped private cloud.

In some aspects, the techniques described herein relate to a media, wherein a license key for the networked software on the computing device of the air-gapped private cloud is provided as an input by the deployment script.

In some aspects, the techniques described herein relate to a media, wherein the encrypted deployment bundle further includes a network service dependency bundle for the networked software and wherein the method further includes a step of executing the deployment script on the computing device of the air-gapped private cloud to deploy the network service dependency bundle on a server of the air-gapped private cloud to provide a network service in the air-gapped private cloud.

In some aspects, the techniques described herein relate to a media, wherein the method further includes a step of digitally signing the encrypted deployment bundle prior to storing it on the portable storage device.

In some aspects, the techniques described herein relate to a media, wherein the method further includes a step of verifying a compliance of the encrypted deployment bundle with a standard of a regulatory body.

In some aspects, the techniques described herein relate to a media, wherein the encrypted deployment bundle further includes configuration information for the networked software.

In some aspects, the techniques described herein relate to a system for deploying networked software into an air-gapped private cloud, the system including: a development computing device including: a first processor; a first port for receiving a portable storage device; and a first set of non-transitory computer-readable media storing computer-executable instructions that, when executed by the first processor, perform steps of: receiving, from a user, a deployment script for the networked software independently from the air-gapped private cloud; building a deployment bundle including the networked software, the deployment script, and a network service dependency bundle for the networked software; storing the deployment bundle on the portable storage device; and a computing device of the air-gapped private cloud, including: a second processor; a second port for receiving the portable storage device; and a second set of non-transitory computer-readable media storing computer-executable instructions that, when executed by the second processor, perform steps of: loading the deployment bundle from the portable storage device; and executing the deployment script to: install the networked software on the computing device of the air-gapped private cloud; and deploy the network service dependency bundle on a server of the air-gapped private cloud to provide a network service in the air-gapped private cloud.

In some aspects, the techniques described herein relate to a system, wherein the deployment bundle further includes a software dependency for the networked software, and wherein the second set of computer-executable instructions are further executed to perform a step of installing the software dependency for the networked software on the computing device of the air-gapped private cloud.

In some aspects, the techniques described herein relate to a system, wherein the deployment bundle is stored on the portable storage device by the development computing device in encrypted form encryption; and wherein the second set of computer-executable instructions are further executed to perform a step of decrypting the deployment bundle.

In some aspects, the techniques described herein relate to a system, wherein the first set of computer-executable instructions are further executed to perform a step of verifying a compliance of the deployment bundle with a standard of a regulatory body.

In some aspects, the techniques described herein relate to a system, wherein at least one of a username or a password for accessing the network service in the air-gapped private cloud by the networked software is provided as an input by the deployment script.

In some aspects, the techniques described herein relate to a system, wherein the air-gapped private cloud is one of a commercial datacenter system, a private company datacenter system, a hybrid commercial and private datacenter, an edge-based server solution, and the like.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
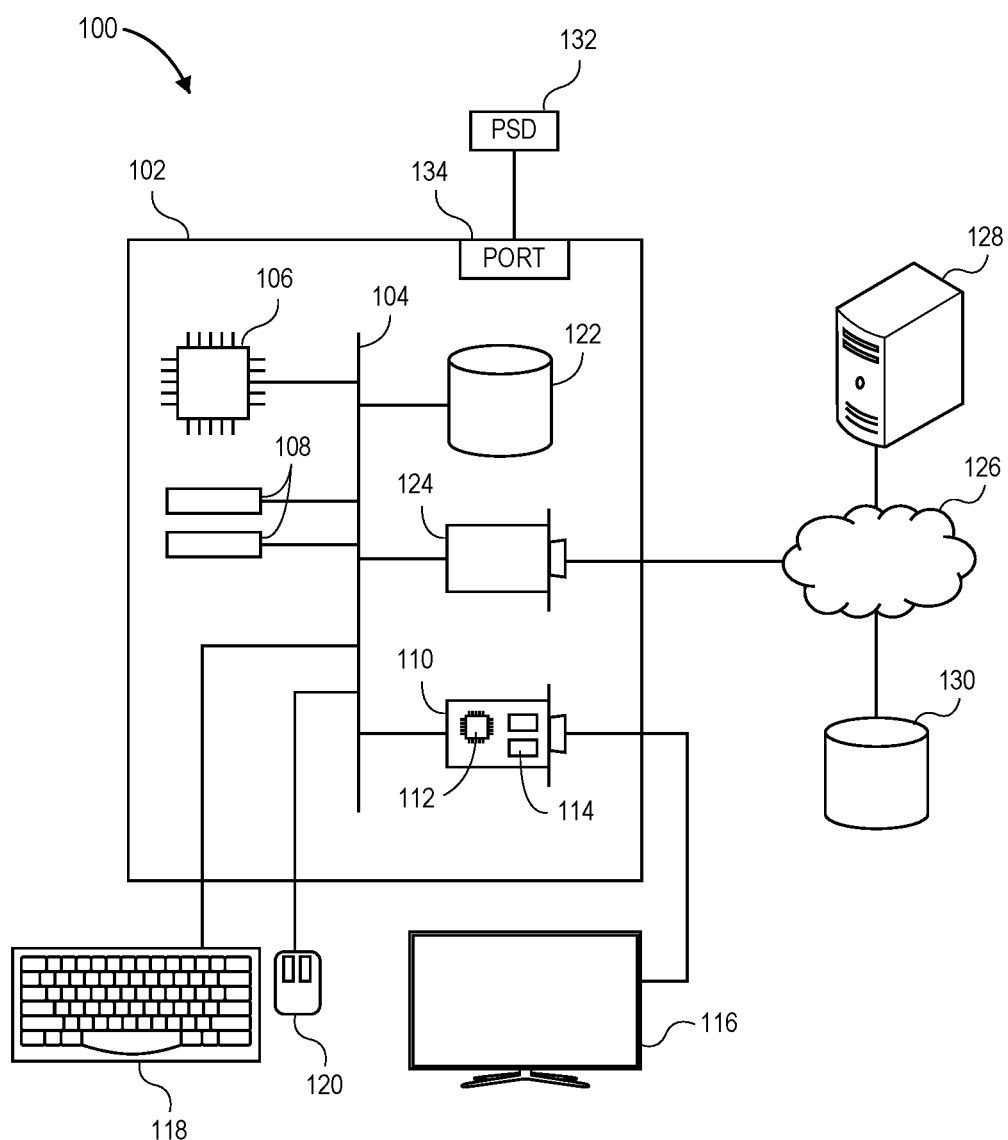
FIG. 1 illustrates an exemplary hardware platform for embodiments described herein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, programs, systems, and processes for providing repeatable processes across air-gapped systems are described. In some embodiments, scripts may be developed outside of an air-gapped system. The script may be developed on any system privately or may use open-source software templates providing automated processes through modular scripting and hierarchical structure. The script may be developed by administrators of the air-gapped system and may be created according to appropriately secure procedures providing for security in the air-gapped system. Furthermore, scripts may be developed on a cloud-based network providing infrastructure as a service and access to developmental tools that may be useful in the air-gapped system. The scripts may be developed in the cloud-based network then moved to a secure location for testing and verification. In some embodiments, only scripts that are verified may be uploaded to the air-gapped system. As such, scripts can be confirmed to meet all security requirements and be verifiably secure prior to being loaded on the air-gapped system. In some embodiments, security requirements may be provided by a regulatory body such as a private company or a government agency.

Upon creation and approval of a script, the script may be bundled and stored on a portable electronic device to be connected to the air-gapped system. In some embodiments, the portable electronic device and script is checked by the air-gapped system for verification prior to unbundling the script. Encryption or digital signatures may be added to the portable electronic device and script to ensure that the data on the portable electronic device meets the security requirements (for example, that it has been appropriately verified prior to transfer). Upon verification, the script may be unbundled and deployed in the air-gapped system. The script may automatically integrate with the air-gapped system, reconfiguring and providing updates for the applications and infrastructure of the air-gapped network system.

Turning first to FIG. 1, an exemplary air-gapped system 100 hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106, which may also be referred to as a processor and which executes computer-executable instructions. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently in non-transitory form. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128 or accessible on a local network such as local network 126. In some embodiments, local network 126 is an air-gapped network such that there is no possible access to remote networks such as, for example, the Internet.

In some embodiment, air-gapped system 100 may be isolated from any other systems or networks. Air-gapped system 100 may be spatially and communicatively isolated from any other local or remote networks. As such, there may be no communication between air-gapped system 100 and any other network or machine. Any peripheral machines connected to network 126 may comprise air-gapped system 100; however, those peripheral machines may be isolated from networks and machines outside of air-gapped system 100. The isolation between air-gapped system 100 and any outside network or machine provides security such that the data stored on air-gapped system 100 cannot be compromised. As such, application installation, system maintenance, and system updating may not be performed by simply connecting to the Internet, calling home, and downloading a new update, as in typical systems. The air-gapped system may be updated by secure portable storage device 132 connecting to port 134 of air-gapped system 100.

Figure 2:
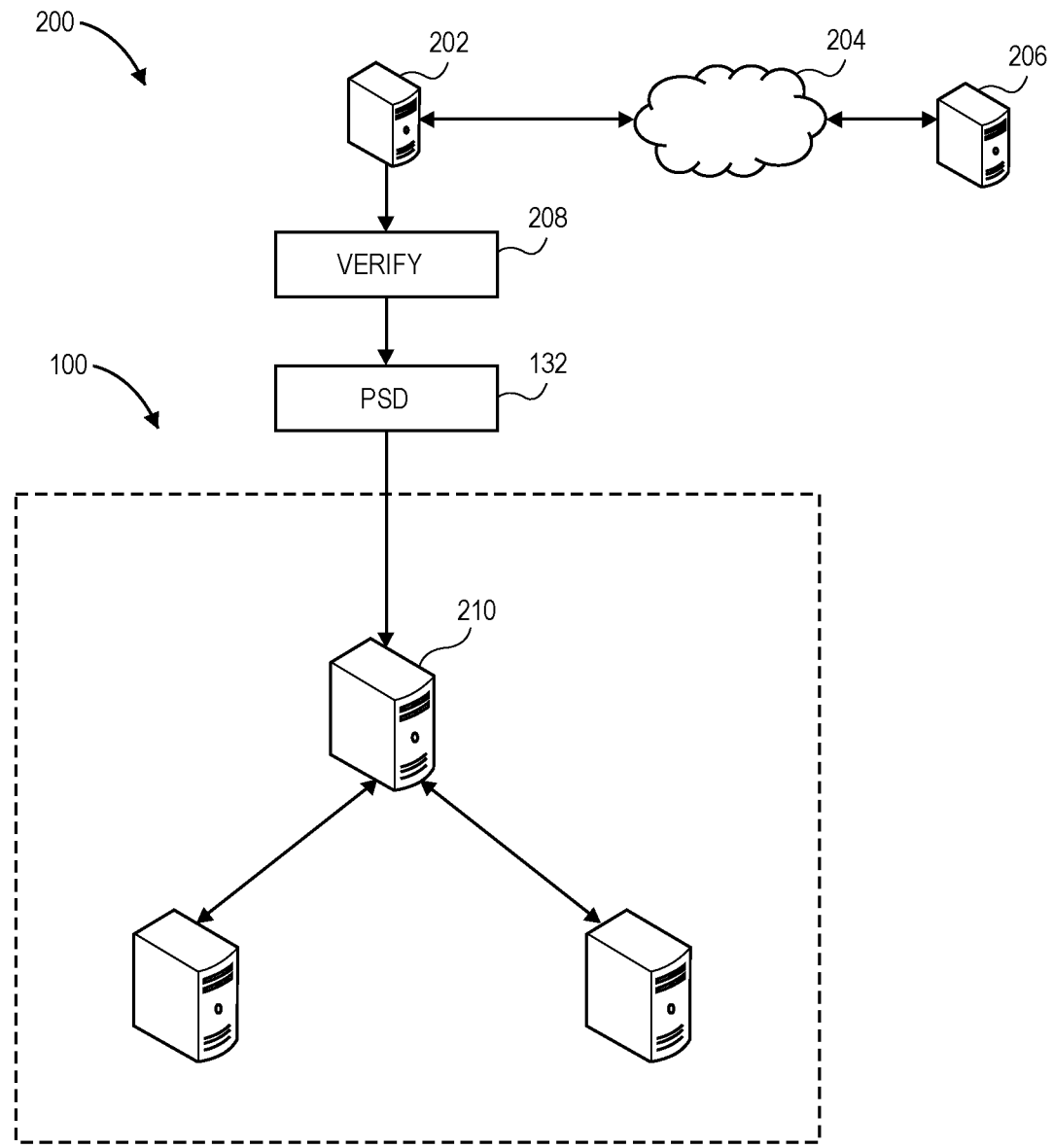
FIG. 2 depicts an exemplary system for generating script and providing the script to the air-gapped system.

FIG. 2 depicts an exemplary system for building scripts over a remote network and securely deploying the script in the air-gapped system 100 generally referenced as system 200. System 200 includes user device 202 and air-gapped computer 210 of air-gapped system 100 (as described above with respect to FIG. 1). A user of system 200 user may be an approved user with access to air-gapped system 100. As such, the user may log into air-gapped system 100 and load a new deployment script and make administrative updates to air-gapped system 100. In some embodiments, the user may be an administrator of air-gapped system 100 that may have administrative access to make updates. In some embodiments, it may be required that any script that the user upload may be verified (or otherwise approved) by a regulatory body such as, for example, a government, a private company, or the like to confirm that it complies with a standard for other set of requirements. As such, any code that is uploaded to air-gapped system 100 may be audited to confirm that it conforms to the regulatory body requirements, and this compliance may be attested in the bundle itself in the form, for example, of a digital signature. In some embodiments, the user may be employed by the regulatory body, and the user may provide encryption or a digital signature to the script after verifying the script at verification step 208 and prior to connecting to air-gapped system 100.

In some embodiments, the user may access user device 202 and connect to network 204. Network 204 may be a remote network (or on-premises network) providing cloud-based services that provides infrastructure as a service such that the user may access the development tools that may be used to build the infrastructure, update applications, and run air-gapped system 100. In some embodiments, network 204 may be the Internet. In some embodiments, programs may be developed over network 204 that may be new applications or updates to applications to be installed in air-gapped system 100. The user may build and edit the script that may be used to automatically reconfigure and update air-gapped system 100. The script may be created in a code development environment provided by network 204 and accessible by a license to the platform in which the script is built in. Network 204 may connect to any of a plurality of computers 206 to provide the cloud-based services described herein.

In some embodiments, the user may create the script to integrate with the components, programs, and programming languages on air-gapped system 100. For example, air-gapped system 100 may comprise existing infrastructure that may have been built previously over network 204 as described above. The script may comprise any applications, updates, configuration management, and any other code that may be added to air-gapped system 100 to automate the updates to air-gapped system 100. The script may be created using any tools and may be written in any programming or scripting language readable and implemented by the software of air-gapped system 100. As such, network 204 may provide software development and integration tools for building the infrastructure and updates of air-gapped system 100. Therefore, the user may access user device 202 to build the script necessary to provide any updates to air-gapped system 100.

In some embodiments, the user may access network 204 to build the script in a modular hierarchical script template for efficient automated deployment. The modules may be built for deploying and launching software in air-gapped system 100. Each module may comprise one or more necessary packages for defining and starting components of air-gapped system 100 such as, for example, launching servers, launching databases, configuring the components, connecting the components, and adding and updating applications. The scripts for deploying these modules may be likewise built in a modular hierarchy for efficient automated deployment. For example, a first application may depend on a second application and a package including an appropriately configured installation of the second application as a port of its package. In such embodiments, the second package may be configured in a similar way and may itself include other packages. The script for deploying the first application may then include an invocation of a second script in the second package to deploy the second application. Broadly speaking, the package for a given application can contain all the local and network dependencies for the application. For example, a given application may have a dependency on a local library and additionally on a network service. In such a case, the package could include packaged versions of both the local library and the local dependency, such that, once the package is deployed (even on a new private cloud) the application has all of its dependencies satisfied and is able to run. Once completed, the script may be verified and bundled for storage and deployment in air-gapped system 100 as described below.

In some embodiments, after the script is developed by the user (for example, on user device 202), the script may be verified at verification step 208 by a regulatory body prior to installation in air-gapped system 100. As described above, air-gapped system 100 may require complete network isolation to maintain a security level to which no unauthorized programs may be introduced. As such, any hardware connected to air-gapped system 100 and any software introduced into air-gapped system 100 may be reviewed and verified prior to connection with air-gapped system 100.

In some embodiments, the script may be reviewed on an independent, isolated computing device prior to being installed in air-gapped system 100. The script may be verified by machine analysis and by a person with access authority other than the user that created the script on user device 202. As such, the script may be verified by a user other than the user that created the script, thus providing a higher level of security. Furthermore, the script may be uploaded to the air-gapped system by a third user, the user, or the user verifying the script.

Upon verification of the script, the script may be bundled and stored on portable storage device 132 for transport to air-gapped system 100. When the script has been created, tested, and approved, the script may be bundled and stored on portable storage device 132. The script may be bundled for deployment in air-gapped system 100 prior to storage on portable storage device 132.

Air-gapped computer 210 of air-gapped system 100 may receive portable storage device 132. Any computing device in air-gapped system 100 may receive portable storage device 132 and check for encryption and download and deploy the script. Air-gapped system 100 may access the bundle and verify that portable storage device 132 and the bundle are secure. In some embodiments, the script may be received by port 134 configured to receive and communicate with portable storage device 132. The bundle may be transferred from portable storage device 132 to air-gapped system 100 via port 134 to maintain isolation from exterior networks. Air-gapped system 100 may not be able to connect to any network for security as described above. As such, the only method of uploading the script may be via port 134 or a plurality of ports associated with air-gapped system 100. Port 134 may be any USB, USC, or any serial port or communication port configured for transferring data by any standard protocol.

Figure 3:
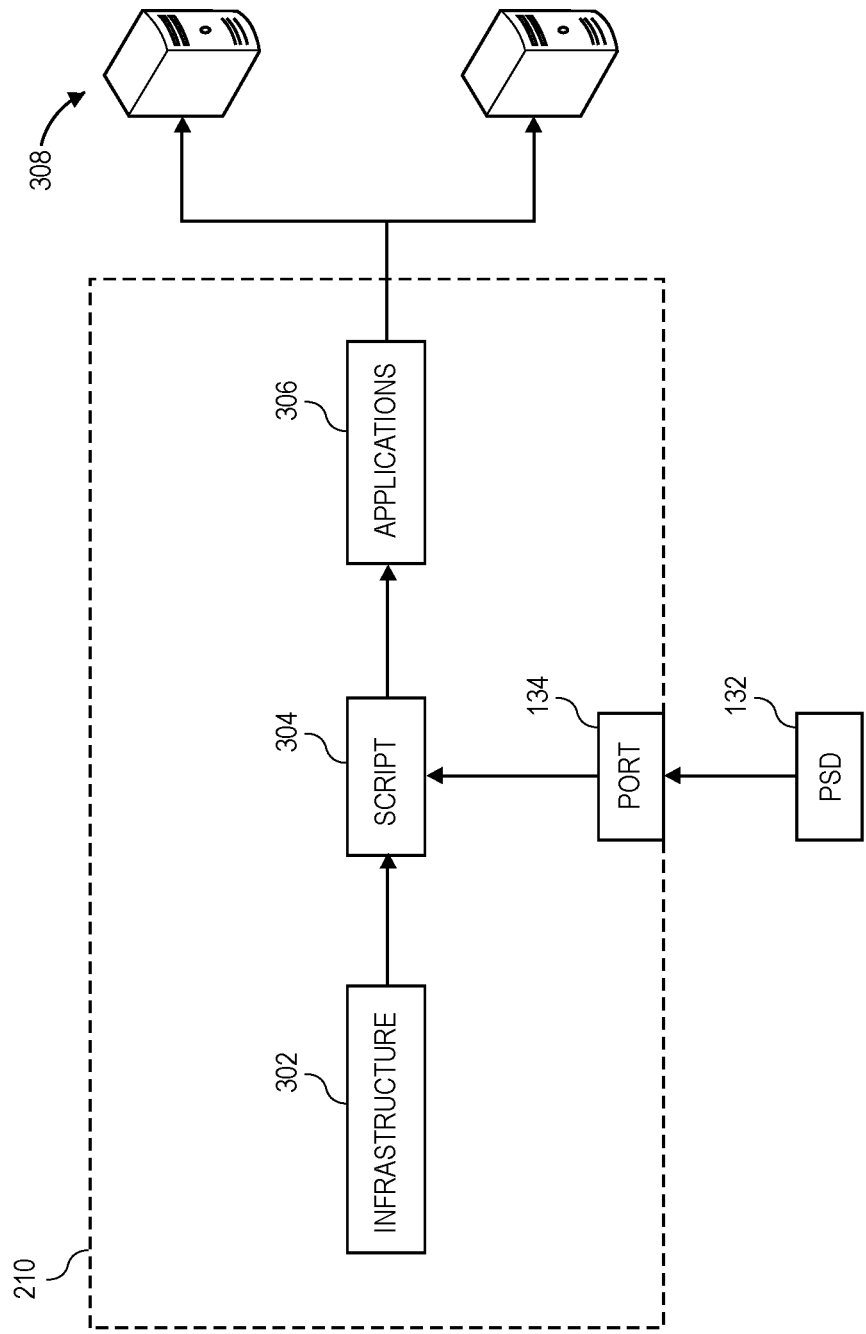
FIG. 3 depicts an exemplary air-gapped system.

FIG. 3 depicts an exemplary embodiment of air-gapped computer 210 receiving portable storage device 132 and presents a workflow process for deploying the script in air-gapped computer 210 which may be computer 102 described above. In some embodiments, script 304 is downloaded and configures infrastructure 302. Script 304 may be developed and tested outside of air-gapped system 100 as described above. In this way, script 304 may be developed separately from air-gapped system 100 and tested and verified before loading.

In some embodiments, script 304 may be uploaded to air-gapped system 100 and may be encrypted or digitally signed such that script 304 may not be accessed or run unless script 304 is appropriately encrypted or signed. Script 304 may undergo a second verification process automatically by air-gapped system 100 using, for example, this encryption or digital signature as a verification code. Air-gapped computer 210 may analyze script 304 and verify that script 304 is from a trusted source. The verification code may be added by the user that verifies script 304 externally or by any verified user. As such, air-gapped computer 210 may verify that script 304 is secure. In some embodiments, the verification code or algorithm unlocks air-gapped system 100 such that the script may be loaded into air-gapped system 100.

In some embodiments, script 304 may be organized in modules (such as, for example, packages) for managing resources in air-gapped system 100 as described above. Each module may comprise the necessary packages for configuring and starting components of air-gapped system 100 such as, for example, launching servers, launching databases, configuring, and connecting the components. Script 304 may be executed for deploying, integrating, and/or updating one or more systems of a private cloud such as air-gapped system 100. The modules of script 304 may also provide software and/or updates for maintenance and upkeep of air-gapped system 100. Script 304 may be built in a template providing hierarchical modular structure for efficient automated deployment of script 304 such that when script 304 is deployed, the associated support structure and infrastructure 302 of air-gapped system 100 is deployed and configured automatically. The template may be provided by a cloud-based scripting service accessible over network 204 as described above.

In some embodiments, script 304 may be deployed to update infrastructure 302, to integrate applications 306, and provide any updates, and services into air-gapped system 100. As described above, in some embodiments, script 304 may comprise any new software to be installed such as, for example, new programs and updates to previous versions of existing programs. Script 304 may initialize and connect hardware components as well as update virtual machines and update any applications run by the virtual machines. Script 304 may create and update the infrastructure 302 and programs of air-gapped system 100.

In some embodiments, air-gapped system 100 may run programs that require licensing for operation. Outside of air-gapped system 100, when the user is creating script 304 over network 204, for example, user device 202 may simply connect to a server operated by the software vendor for the program requiring license verification. As such, user device 202 may acquire or verify licensing of the software prior to operation. However, in air-gapped system 100, it may not be possible to verify the license, as air-gapped system 100 is not capable of connecting to network 204 to verify licensing. As such, the license verification must be provided in script 304 as script 304 is the only input into air-gapped system 100. In some embodiments, a licensing verification server package may be provided in the package for the software program to be deployed as part of the virtual cloud. Alternatively, the license verification may be provided into air-gapped computer 210 as an input of the configuration files of script 304. As such, when infrastructure 302 is run license verification may be provided as an input such that there are no obstacles to deploying the changes input by script 304. Similarly, usernames and passwords for accessing any needed services in the private cloud may be provided as an input in the configuration files of script 304 and included in the bundle thereby.

In some embodiments, when infrastructure 302 is reconfigured through script 304 and applications 306 are updated, the tasks provided by script 304 may be provided to air-gapped network 308. Air-gapped network 308 may be any computing components, servers, databases, and any other components that may be included in a private cloud, such as system 100. In some embodiments, air-gapped computer 210 deploys the configurations provided by script 304 then provides these changes to the air-gapped network 308. As such, script 304 may not be manually provided to each individual computing device in air-gapped system 100. However, in other embodiments, each individual computing device in air-gapped system 100 may require individual input of script 304. As such, portable storage device 132 may be connected to each computing device independently or each computing device may be updated automatically depending on the configuration of air-gapped system 100.

In some embodiments, when the update to air-gapped system 100 is complete, the performance of air-gapped system 100 may be tested. Infrastructure 302 may be reconfigured to develop new structure and updated programs based on script 304. In some embodiments, the newly introduced script 304 may re-structure air-gapped system 100 and may provide updates to the programs installed on the air-gapped system 100. As such, air-gapped system 100 may be tested after deployment to verify that the newly deployed system is functioning correctly. As a part of the deployment of script 304, inputs may be provided to air-gapped system 100 and the functions and outputs of air-gapped system 100 may be checked against specifications. Air-gapped system 100 may be compared to provided specifications to verify that air-gapped system 100 performs to the designated standards. When script 304 is verified and air-gapped system 100 is tested, air-gapped system 100 may then be available for use by authorized users of air-gapped system 100.

In some embodiments, a plurality of air-gapped systems may comprise similar components and may be utilized for similar purposes. The plurality of air-gapped systems may be separated by distance and communication and, as such, may require separate updates. However, the plurality of separate air-gapped systems may require uniformity as the separate air-gapped systems may perform the same or similar functions. As such, in an exemplary embodiment, a single update may be scripted for updating the plurality of air-gapped systems. The scripted update may be verified by the regulatory body independently of the system used for scripting and the air-gapped systems. The verified script may be bundled such that script 304 may be deployed in air-gapped system 100 and stored on portable storage device 132 to isolate script 304 from exterior systems. The bundled script may then be uploaded to air-gapped system 100 and unbundled as described above. Portable storage device 132 may then be connected to a second air-gapped system of the plurality of air-gapped systems or a separate portable storage device 132 with a separate verification but storing the same script 304 and may be connected to the second air-gapped system.

In some embodiments, script 304 may be provided to a plurality of air-gapped systems that are not the same, but components of the plurality of air-gapped systems may be common. As such, infrastructure 302 may be configured for updates to common components. As such, the same script 304 may be provided to each air-gapped system of the plurality of air-gapped system to update common components even when the air-gapped systems are not identically configured.

In some embodiments, air-gapped system 100 may run any type of software and may be used for any system that requires isolation from remote networks. For example, air-gapped system 100 may be, for example, any commercial datacenter system, a private company datacenter system, a hybrid commercial and private datacenter, an edge-based server solution, and any other system that may provide secure data processing and secure computing components. Any general systems that are isolated from remote and local unsecure networks may be updated and maintained as described in embodiments herein.

Figure 4:
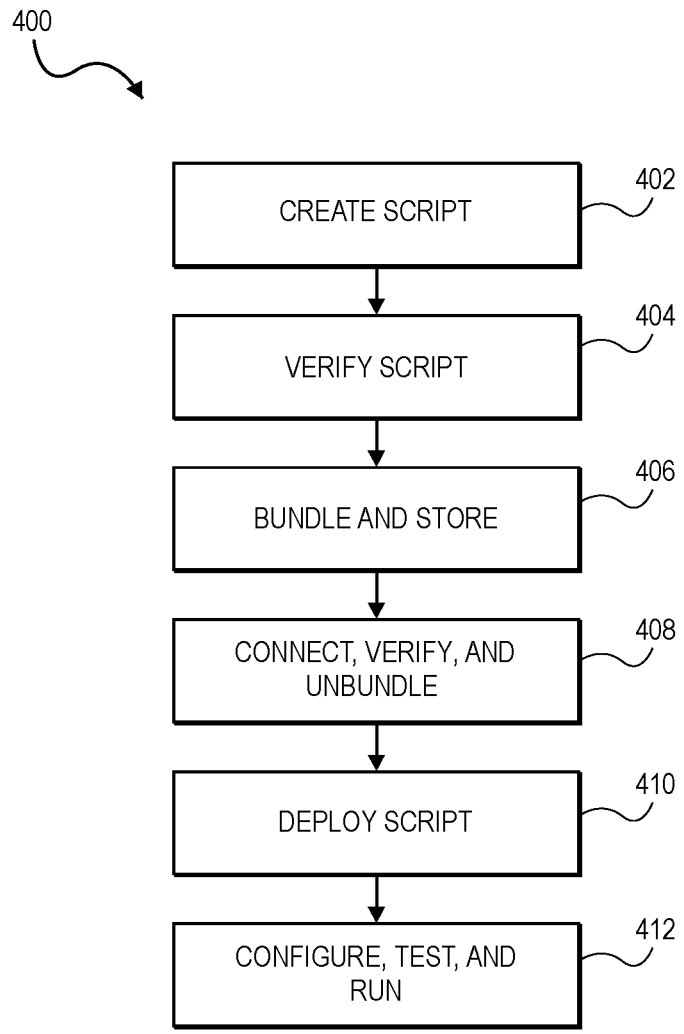
FIG. 4 depicts an exemplary process for providing script to an air-gapped system.

FIG. 4 depicts a secure and repeatable process of providing secure script 304 to air-gapped system 100 generally referenced by the numeral 400. In some embodiments, air-gapped system 100 may be isolated from any networks and exterior computing components by space and communication. Furthermore, air-gapped system 100 may not connect with any devices that are not verified and encrypted by a governing authority. Air-gapped system 100 may securely receive and run any programs by any programming languages by the processes described herein.

At step 402, script 304 for re-structuring and/or updating air-gapped system 100 may be built on a network independently from air-gapped system 100. In some embodiments, script 304 is created on any platform that provides virtual infrastructure such that script 304 may be stored in a format readable by air-gapped system 100. Any infrastructure configuration and/or applications and/or programs and/or updates may be created in script 304. Script 304 may be tested in a virtual environment to verify correct operation prior to deployment in an operational environment. In some embodiments, scripts may be created in any virtual infrastructure system for configuring any virtual infrastructure.

At step 404, in some embodiments, script 304 may be verified by a verifying user or regulatory body. In some embodiments, script 304 may be provided on a secure computer and verified by an authorized user. The authorized user may verify that script 304 meets the requirements of the regulatory agency. In some embodiments, the authorized user may be the user that created the script or may be a second user that only verifies the script or verifies the script and uploads the script to air-gapped system 100. Script 304 may follow any security measures applied by the governing regulatory body to maintain a secure chain of command.

At step 406, script 304 may be bundled and stored for transfer to air-gapped system 100 as described in embodiments above. The bundle may comprise script 304 together with zero or more software (or software update) packages in modular form stored in a hierarchical structure with any resources necessary for updating air-gapped system 100. Script 304 may be bundled for efficient automated transfer and deployment. Furthermore, the bundle may be password protected, encrypted, or digitally signed with for secure transfer. As such, only authorized users may access or modify script 304. In some embodiments, the bundled script 304 may be stored on portable storage device 132 with or without encryption.

At step 408, portable storage device 132 may be connected to air-gapped system 100 where the security features of portable storage device 132 and the bundle are checked. Portable storage device 132 may provide a specific code (such as a password or encryption key) for secure data transfer or may be otherwise configured to communicate securely with air-gapped system 100. When the encryption is decrypted in air-gapped system 100, script 304 may be deployed.

At step 410, script 304 may be deployed in air-gapped system 100 as described in embodiments above. In some embodiments, script 304 may be unbundled and deployed to automatically integrate with infrastructure 302 as described in embodiments above. At steps 410 and 412, The script may reconfigure infrastructure 302 to install new software or infrastructure in the private cloud or otherwise update the systems of air-gapped system 100.

At step 412, infrastructure 302 and script 304 may reconfigure air-gapped system 100 and update applications based on script 304 as described in embodiments above. When air-gapped system 100 is updated, the applications, programming, and systems may be tested against requirements of the regulatory agency. When air-gapped system 100 meets the requirements, air-gapped system 100 may be accessed by authorized users.

In some embodiments, the updates may be distributed throughout machines in air-gapped system 100 such that the machines are not individually updated. In some embodiments, the machines may be individually connected with portable storage device 132 and updated. Furthermore, script 304 may be used to update a plurality of independent air-gapped systems that comprise similar components and infrastructure.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of deploying networked software into an air-gapped private cloud, the method comprising:

providing the air-gapped private cloud by a plurality of air-gapped computing devices communicatively connected,
wherein the plurality of air-gapped computing devices is physically isolated from any outside network communication;
generating, by a non-air-gapped computing device of a set of computing devices not associated with the air-gapped private cloud, a deployment script for the networked software;
building, on the non-air-gapped computing device, a deployment bundle comprising the networked software, the deployment script, and a network service dependency bundle for the networked software,
wherein the networked software comprises a commercially available software update and is obtained by the non-air-gapped computing device over a wide-area network;
storing the deployment bundle on a portable storage device readable by a computing device of the plurality of air-gapped computing devices providing the air-gapped private cloud;
transferring the deployment bundle to the computing device of the air-gapped private cloud using the portable storage device physically connected to the computing device; and
executing the deployment script on the computing device of the air-gapped private cloud to:
install the networked software on the computing device of the air-gapped private cloud; and
deploy the network service dependency bundle in of the air-gapped private cloud to provide a network service to the plurality of air-gapped computing devices in the air-gapped private cloud.

2. The method of claim 1, further comprising a step of verifying a compliance of the deployment bundle with a standard of a regulatory body prior to the storing of the deployment bundle on the portable storage device.

3. The method of claim 2, further comprising attesting the compliance of the deployment bundle with the standard of the regulatory body via a digital signature.

4. The method of claim 1, wherein the network service in the air-gapped private cloud is a license service for the networked software.

5. The method of claim 1, wherein the air-gapped private cloud is one of a commercial datacenter system, a private company datacenter system, a hybrid commercial and private datacenter, or an edge-based server solution.

6. The method of claim 1, wherein the deployment bundle is encrypted before storage on the portable storage device.

7. The method of claim 6, wherein the deployment script is decrypted in the air-gapped private cloud.

8. The method of claim 1, wherein the networked software is an update for a previous version of the networked software running in the air-gapped private cloud.

9. One or more non-transitory computer-readable media storing computer-executable instructions that, when executed by a processor, performs a method of deploying networked software into an air-gapped private cloud, the method comprising:
providing the air-gapped private cloud by a plurality of air-gapped computing devices communicatively connected,
wherein the plurality of air-gapped computing devices is physically isolated from any outside network communication;
generating, by a non-air-gapped computing device of a set of computing devices not associated with the air-gapped private cloud, a deployment script for the networked software;
building, on the non-air-gapped computing device, an encrypted deployment bundle comprising the networked software, the deployment script, and a software dependency for the networked software,
wherein the networked software comprises a commercially available software update and is obtained by the non-air-gapped computing device over a wide-area network;
storing the encrypted deployment bundle on a portable storage device readable by a computing device of the air-gapped private cloud;
transferring the encrypted deployment bundle to the computing device of the air-gapped private cloud using the portable storage device physically connected to the computing device;
decrypting the encrypted deployment bundle on the computing device of the air-gapped private cloud; and
executing the deployment script on the computing device of the air-gapped private cloud to:
install the networked software on the computing device of the air-gapped private cloud; and
install the software dependency for the networked software on the computing device of the air-gapped private cloud.

10. The media of claim 9, wherein a license key for the networked software on the computing device of the air-gapped private cloud is provided as an input by the deployment script.

11. The media of claim 9, wherein the encrypted deployment bundle further comprises a network service dependency bundle for the networked software and wherein the method further comprises a step of executing the deployment script on the computing device of the air-gapped private cloud to deploy the network service dependency bundle on a server of the air-gapped private cloud to provide a network service in the air-gapped private cloud.

12. The media of claim 9, wherein the method further comprises digitally signing the encrypted deployment bundle prior to storing it on the portable storage device.

13. The media of claim 9, wherein the method further comprises a step of verifying a compliance of the encrypted deployment bundle with a standard of a regulatory body.

14. The media of claim 9, wherein the encrypted deployment bundle further comprises configuration information for the networked software.

15. A system for deploying networked software into an air- gapped private cloud, the system comprising:
a development computing device comprising:
at least one first processor configured for Internet communication;
a first port for receiving a portable storage device; and
a first set of non-transitory computer-readable media storing a first set of computer-executable instructions that, when executed by the at least one first processor, perform a first method comprising:
receiving, via Internet communication, the networked software comprising a commercially available software update;
generating a deployment script for the networked software;

building a deployment bundle comprising the networked software, the deployment script, and a network service dependency bundle for the networked software; and storing the deployment bundle on the portable storage device; and a computing device of the air-gapped private cloud, comprising:

at least one second processor;

a second port for receiving the portable storage device; and a second set of non-transitory computer-readable media storing a second set of computer-executable instructions that, when executed by the at least one second processor, perform a second method comprising:

loading the deployment bundle from the portable storage device to the computing device by physically connecting the portable storage device to the computing device; and executing the deployment script to:

install the networked software on the computing device of the air-gapped private cloud; and deploy the network service dependency bundle on at least one air-gapped computing device of the air-gapped private cloud to provide a network service in the air-gapped private cloud.

16. The system of claim 15, wherein the deployment bundle further comprises a software dependency for the networked software, and wherein the second set of computer-executable instructions are further executed to perform a step of installing the software dependency for the networked software on the computing device of the air-gapped private cloud.

17. The system of claim 15, wherein the deployment bundle is stored on the portable storage device by the development computing device in encrypted form encryption, and wherein the second set of computer-executable instructions are further executed to perform a step of decrypting the deployment bundle.

18. The system of claim 15, wherein the first set of computer-executable instructions are further executed to perform a step of verifying a compliance of the deployment bundle with a standard of a regulatory body.

19. The system of claim 15, wherein at least one of a username or a password for accessing the network service in the air-gapped private cloud by the networked software is provided as an input by the deployment script.

20. The system of claim 15, wherein the air-gapped private cloud is one of a commercial datacenter system, a private company datacenter system, a hybrid commercial and private datacenter, or an edge-based server solution.

* * * * *